(12) United States Patent
Beers

(10) Patent No.: US 11,170,043 B2
(45) Date of Patent: Nov. 9, 2021

(54) METHOD FOR PROVIDING VISUALIZATION OF PROGRESS DURING MEDIA SEARCH

(71) Applicant: DELUXE ONE LLC, Burbank, CA (US)

(72) Inventor: Brett Beers, Vancouver, WA (US)

(73) Assignee: DELUXE ONE LLC, Burbank, CA (US)

(*) Notice: Subject to any disclaimer, the term of this patent is extended or adjusted under 35 U.S.C. 154(b) by 0 days.

(21) Appl. No.: 16/837,876

(22) Filed: Apr. 1, 2020

(65) Prior Publication Data

US 2020/0320121 A1    Oct. 8, 2020

Related U.S. Application Data

(60) Provisional application No. 62/831,055, filed on Apr. 8, 2019.

(51) Int. Cl.
*G06F 16/738* (2019.01)
*G06F 3/0484* (2013.01)
(Continued)

(52) U.S. Cl.
CPC ........ *G06F 16/738* (2019.01); *G06F 3/04847* (2013.01); *G06F 16/7834* (2019.01);
(Continued)

(58) Field of Classification Search
CPC ...... G06F 16/54; G06F 16/638; G06F 16/738; G06F 16/783; G06F 7/02
See application file for complete search history.

(56) References Cited

U.S. PATENT DOCUMENTS

| 8,853,516 B2* | 10/2014 | Arimoto | G10H 1/0008 |
| | | | 84/600 |
| 9,460,201 B2* | 10/2016 | Anniballi | G06F 16/638 |
| 2015/0160808 A1* | 6/2015 | Walkin | G06Q 30/0267 |
| | | | 715/800 |

FOREIGN PATENT DOCUMENTS

WO    WO-2016192395 A1 * 12/2016    ............ G10L 25/51

OTHER PUBLICATIONS

Cook et al, "Visualizing Similarity Data with a Mixture of Maps," 2007, Proceedings of the Eleventh International Conference on Artificial Intelligence and Statistics (Year: 2007).*

(Continued)

*Primary Examiner* — Alvin H Tan
(74) *Attorney, Agent, or Firm* — Dorsey & Whitney LLP

(57) ABSTRACT

A media system may include a processor configured to match between a first media and one or more second media, and a widget configured to display a progress of the matching. The widget may include a first display area configured to display a first visual representation of the first media, and a second display configured to concurrently display a second visual representation of a selected one of a second media being matched to the first media while the matching is being performed. A visual representation may include a spring map comprising a time axis and a frequency axis, where a height at each coordinate of the spring map is determined based on a frequency output of an audio waveform associated with the video. The widget may include a virtual hallway presentation having a first wall and a second wall to display the progress of the matching.

15 Claims, 12 Drawing Sheets

(51) Int. Cl.
*G06T 11/20* (2006.01)
*G06F 16/783* (2019.01)
*G10L 25/51* (2013.01)
*H04N 21/472* (2011.01)
*G10L 21/14* (2013.01)

(52) U.S. Cl.
CPC ............ *G06T 11/203* (2013.01); *G10L 21/14* (2013.01); *G10L 25/51* (2013.01); *H04N 21/47217* (2013.01)

(56) References Cited

OTHER PUBLICATIONS

Google Machine Translation of WO 2016/192395 (Year: 2016).*
Brett, Matthew, "An introduction to smoothing," Oct. 26, 2014, Available https://matthew-brett.github.io/teaching/smoothing_intro. html (Year: 2014).*

* cited by examiner

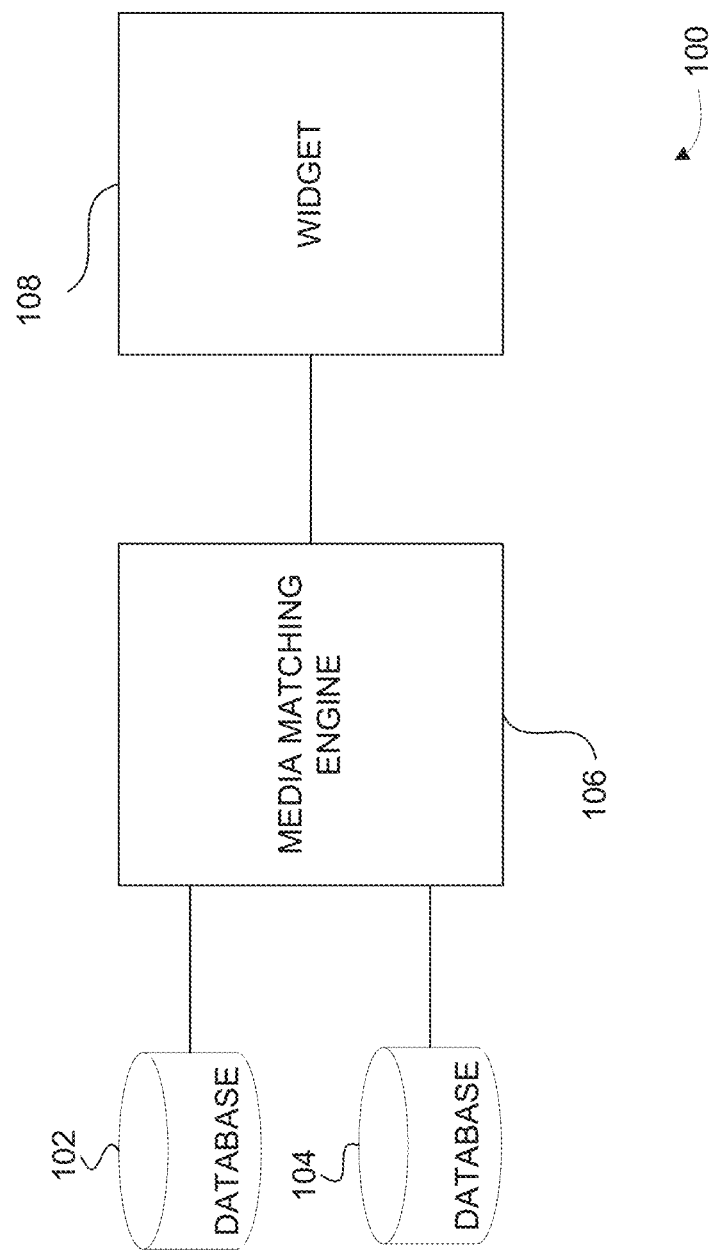

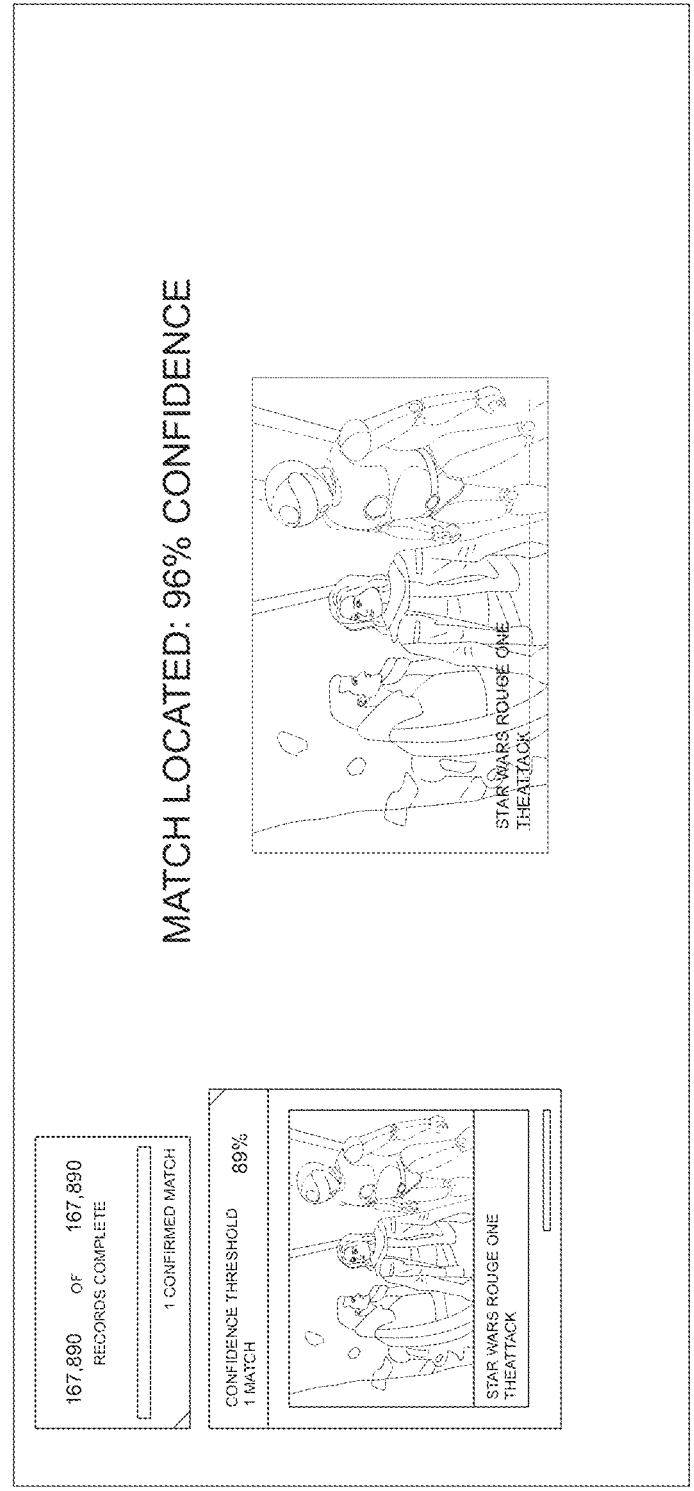

METHOD FOR PROVIDING VISUALIZATION OF PROGRESS DURING MEDIA SEARCH

CROSS REFERENCE TO RELATED APPLICATIONS

This application claims the benefit of priority pursuant to 35 U.S.C. § 119(e) of U.S. provisional application No. 62/831,055 filed 8 Apr. 2019 entitled "Method for providing visualization of progress during media search," which is hereby incorporated herein by reference in its entirety.

TECHNICAL FIELD

The present disclosure is related to media search and in particular to displaying a visualization of a progress of a media search while the search is being performed.

BACKGROUND

Companies working in media services may receive content from hundreds of sources. As such, a media search is often time consuming. For example, when searching for media files in a large media library or database, a user often has to wait for a significant amount of time. Existing systems display widgets such as a spinning wheel, a progress bar, or play a music. However, these widgets do not provide insightful information about the search currently being performed.

The information included in this Background section of the specification, including any references cited herein and any description or discussion thereof, is included for technical reference purposes only and is not to be regarded subject matter by which the scope of the invention as defined in the claims is to be bound.

SUMMARY

According to the present disclosure, related systems and processes are disclosed for providing content visualization of media under review during a search of a media library or database. In some implementations, a visual representation of a virtual hallway may be displayed to a user. The virtual hallway presentation may have a first sidewall and a second wall to display the progress of the matching by displaying video segments of media files being searched. In some implementations, a visual representation of audio files being searched may include a spring map comprising a time axis and a frequency axis, where a height at each coordinate of the spring map is determined based on a frequency output of an audio waveform associated with the media.

In an exemplary implementation, a system for visualization of media matching may include a media match engine and a display wizard. The media match engine may include a processor configured to perform a matching between a first media and one or more second media. The widget may be configured to display a progress of the matching. The widget may further include a first display area configured to display a first visual representation of the first media. The widget may also include a second display configured to concurrently display a second visual representation of one of the one or more second media being matched to the first media while the matching is being performed.

In another exemplary implementation, a method is disclosed including the following steps. A first audio representation of a first media being matched in a media matching process is determined. A second audio representation of a second media being matched in the media matching process is determined. A first spring map of the first media based on the first audio representation is constructed. A second spring map of the first media based on the second audio representation is constructed. The first spring map and the second spring map are concurrently rendered during the media matching process.

In a further exemplary implementation, a system for visualization of media matching may include a media match engine and a display wizard interface. The media match engine may include a processor configured to perform a matching between a first media and a plurality of second media. The widget interface may be configured to display a progress of the matching. The widget interface may present a virtual hallway having at least a first wall. The first wall may include a first display area configured to display a video of one or more of the plurality of second media while a selected one of the second media is matched to the first media. Upon determination by the media match engine that the selected one of the second media matches the first media, the media match engine is may be configured to pause display of the video of the matched selected one of the second media. Upon determination by the media match engine that the selected one of the second media does not match the first media, the media match engine may be configured to continue display of the video of the one or more of the plurality of second media.

In another exemplary implementation, a method is disclosed including the following steps. In a processor, a matching is performed between a first media and one or more of a plurality of second media. A progress of the matching is displayed through a widget interface by displaying a video of one or more of the plurality of second media on a first wall of a virtual hallway presentation while a selected one of the second media is matched to the first media and displaying a search space and navigation of a selected one of second media in the plurality of second media on a second wall of the virtual hallway presentation. Upon determining that the selected one of the second media matches to the first media, display of the video of the matched selected one of second media may be paused. Upon determining that the selected one of the second media does not match the first media, display of the video of the one or more of the plurality of second media may be continued.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 1 is a diagram of an example media system.

FIGS. 4A-4C are examples of a video search application.

DETAILED DESCRIPTION

Figure 2A:
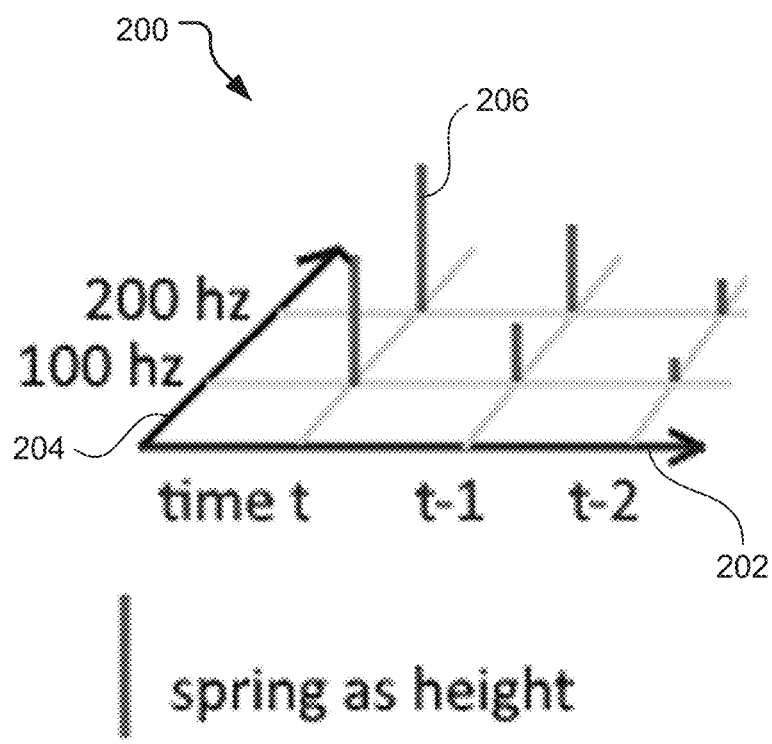
FIGS. 2A-2D are examples of an audio conform application.

FIG. 1 is a diagram of an example media system for displaying a visualization of a progress of a media search while the search is being performed. In some examples, a media system 100 may include a media match engine 106 configured to perform a matching between a first media 102 and one or more second media 104. In some examples, the media match engine may include an audio conform application. For example, the audio conform system may compare background sound effects of different media files and align two media based on the alignment frames of the media files. Audio conform may have various applications, such as aligning foreign language dubbed film to the master copy of the original film.

In some examples, the media match engine may be a media search system for searching the desired/correct version of media desired or, alternatively. The media search system may use a search algorithm to compare an unknown version of media with known versions of media within a vast film/video library to identify the unknown version. For example, there are multiple different cuts of films, e.g., original release, director's cut, airplane suitable, broadcast TV edited, foreign language, etc. In some examples, the media search system may compare the audio signatures of the soundtracks instead of performing a video matching. Hashes of the entire soundtracks of each media file in the library are made. An unknown media may be represented by a hash of the entire soundtrack, and can be compared with the soundtrack of the media in each library file to identify the film and version.

The system 100 may also include a widget 108 configured to display a progress of the matching while the matching is being performed in the media matching engine 106. In some examples, the widget may include a first display area configured to display a first visual representation of the first media being matched; and a second display configured to concurrently display a second visual representation of one of the one or more second media being matched to the first media. This is further described in detail with reference to an application in FIGS. 2A-2D.

Figure 2B:
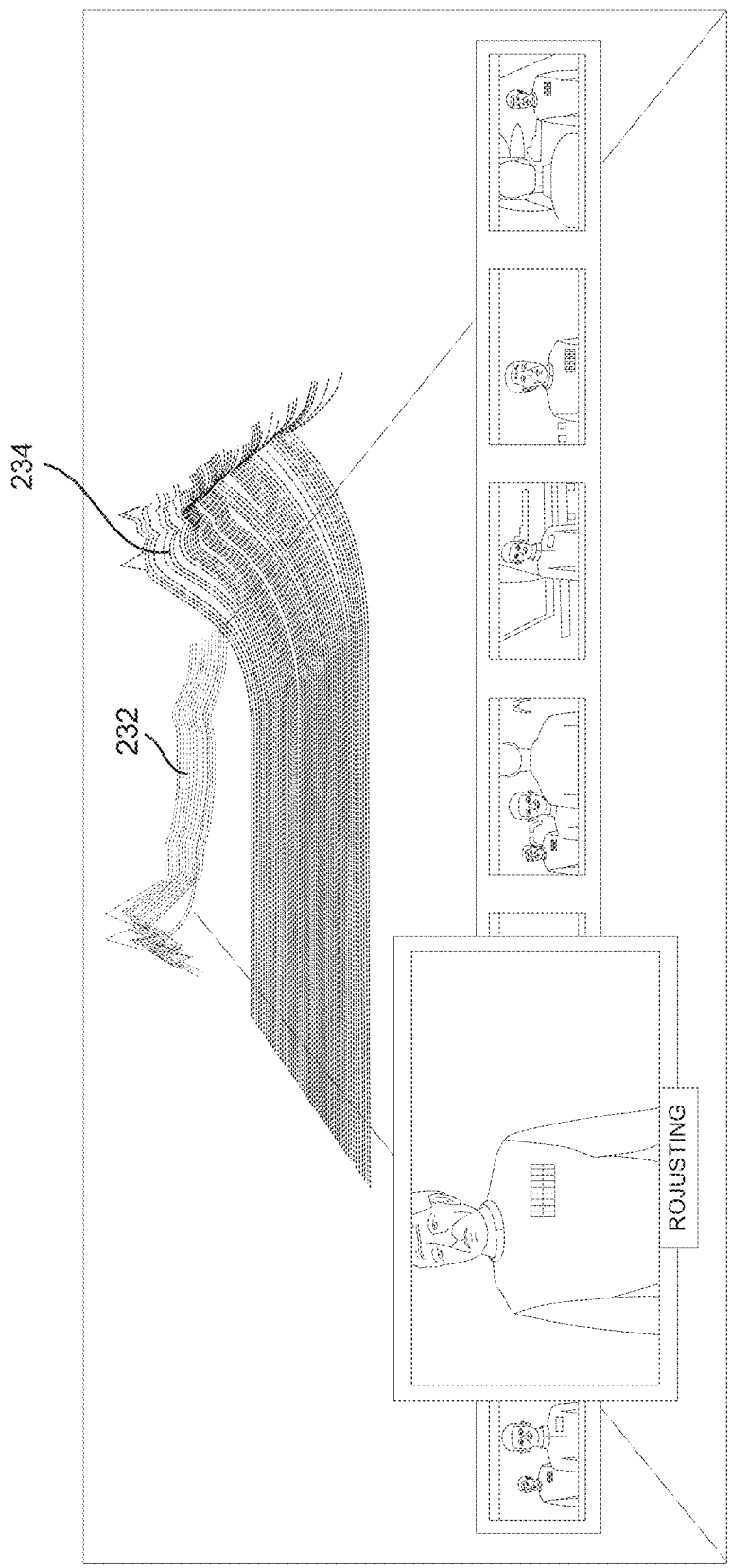

FIGS. 2A-2D are examples of an audio conform application. For example, as two media are being matched, each of the two media is represented by a visual representation. For example, as shown in FIG. 2B, a widget may provide an audio conform animation. In some examples, the first media is represented by a spring map 232, and the second media is represented by a spring map 234. The spring map represents the audio/visual content of each respective media. For example, in FIG. 2A, a spring map 200 may include a first axis 202 indicating a time and a second axis 204 indicating a frequency, and a height 206 at each coordinate defined by the first axis and the second axis. At each coordinate in the spring map, a spring is defined by a height. In some examples, the height 206 at each coordinate may be based on a frequency output of an audio waveform associated with the media. In some examples, the height of the spring map may be determined based on Hook's law. This may give the bouncing effect of the spring map as the frequency output vary in audio waveform of each media. As such, the spring map of the first media and the second media may be different. As the match between the first media and the second media is being performed in the media match engine 106, user may visualize the spring map of the first media and the second media. When two media are different (not matched), the respective audio may generate different spring maps (e.g., FIG. 2B). When two media are matched, the respective audio may generate similar spring maps, e.g., 242 and 244 in FIG. 2C, and 252 and 254 in FIG. 2D.

Figure 2C:
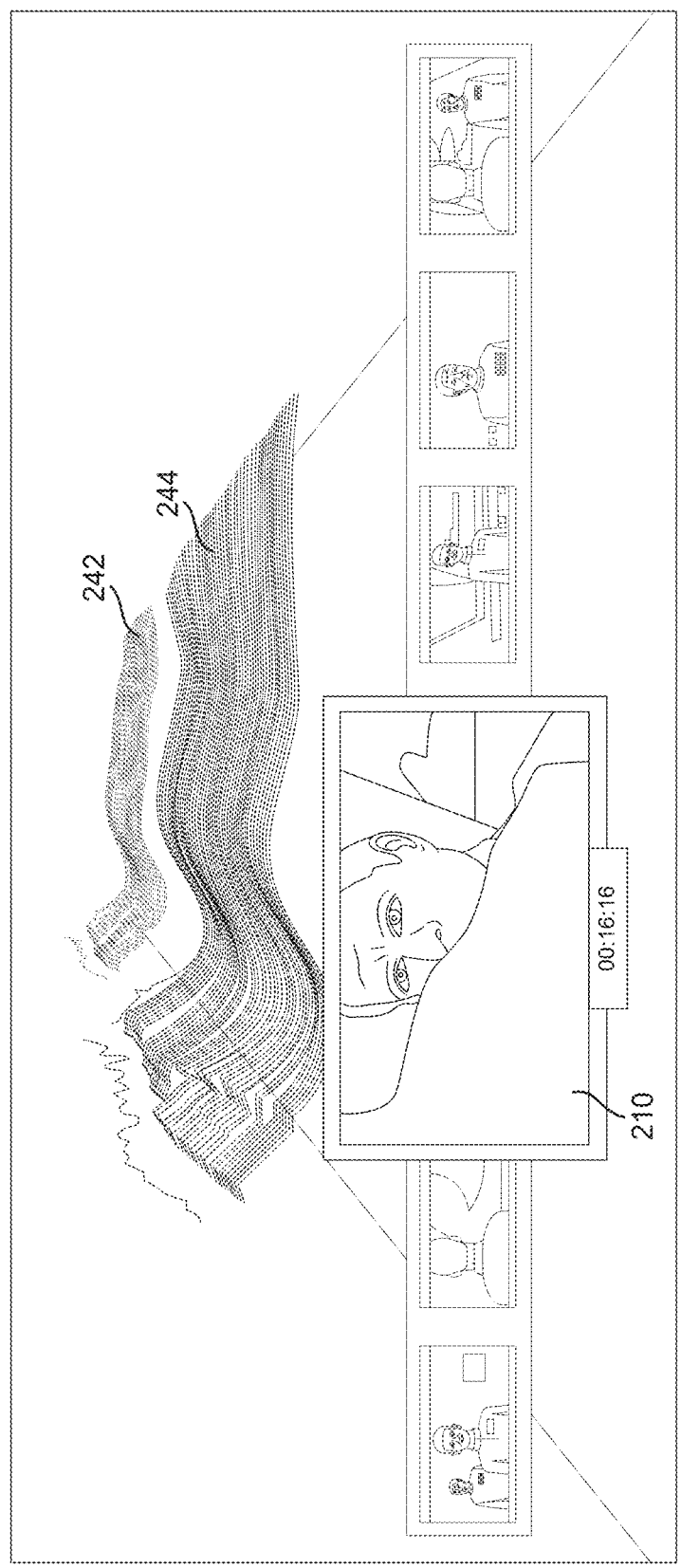
Figure 2D:
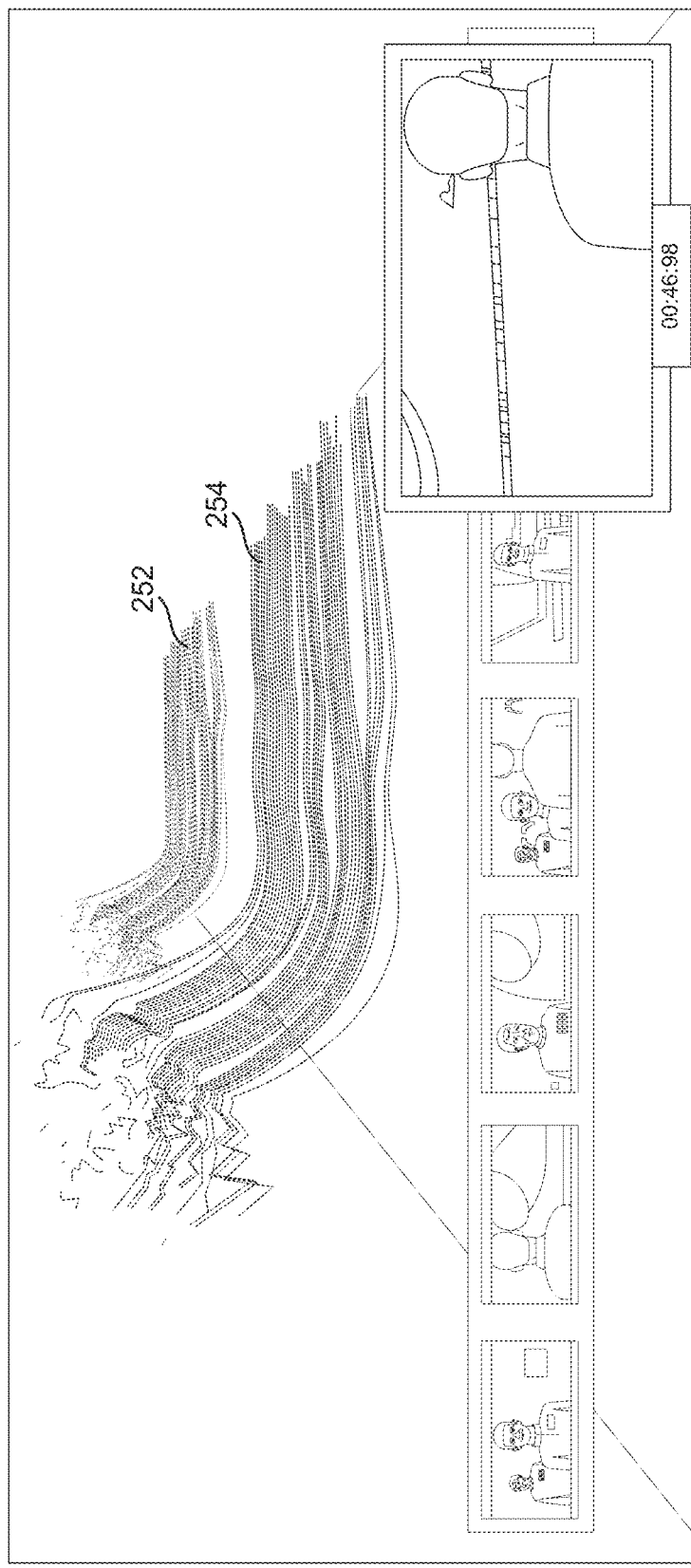
Figure 3A:
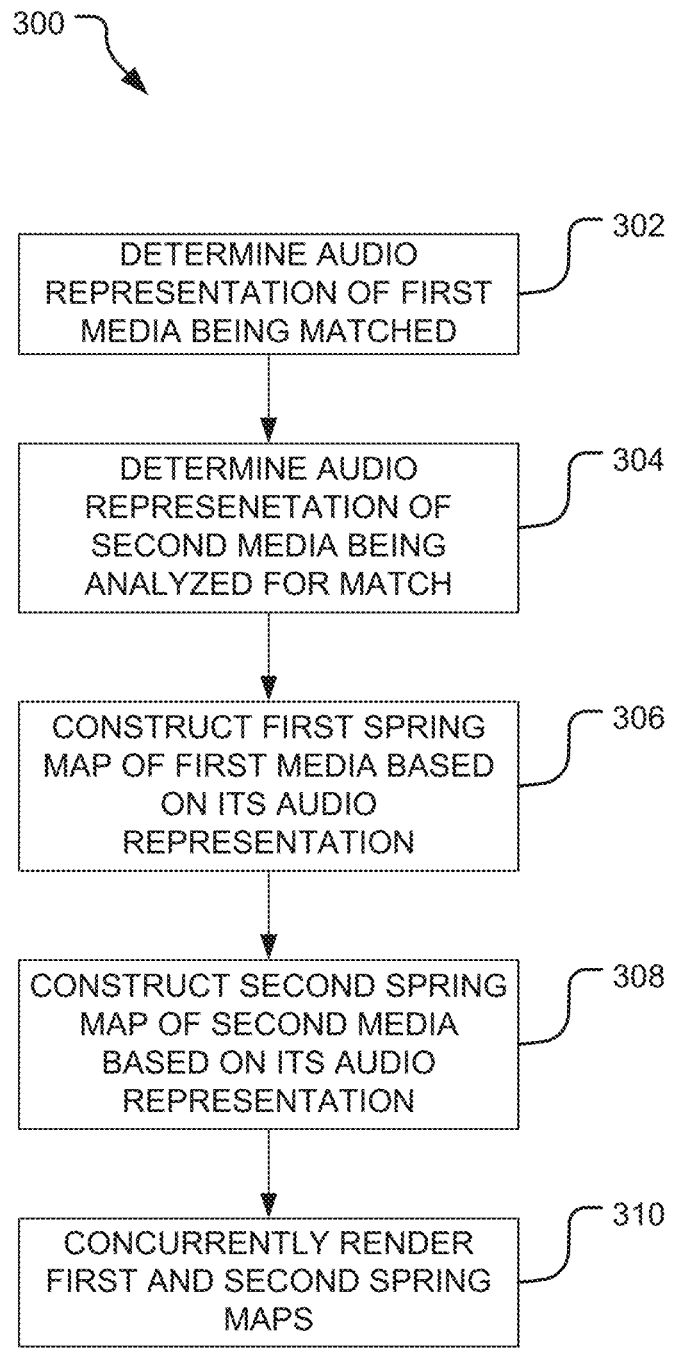
FIGS. 3A-3B are diagrams of an example process of displaying a widget to show a progress of audio conformance.
Figure 3B:
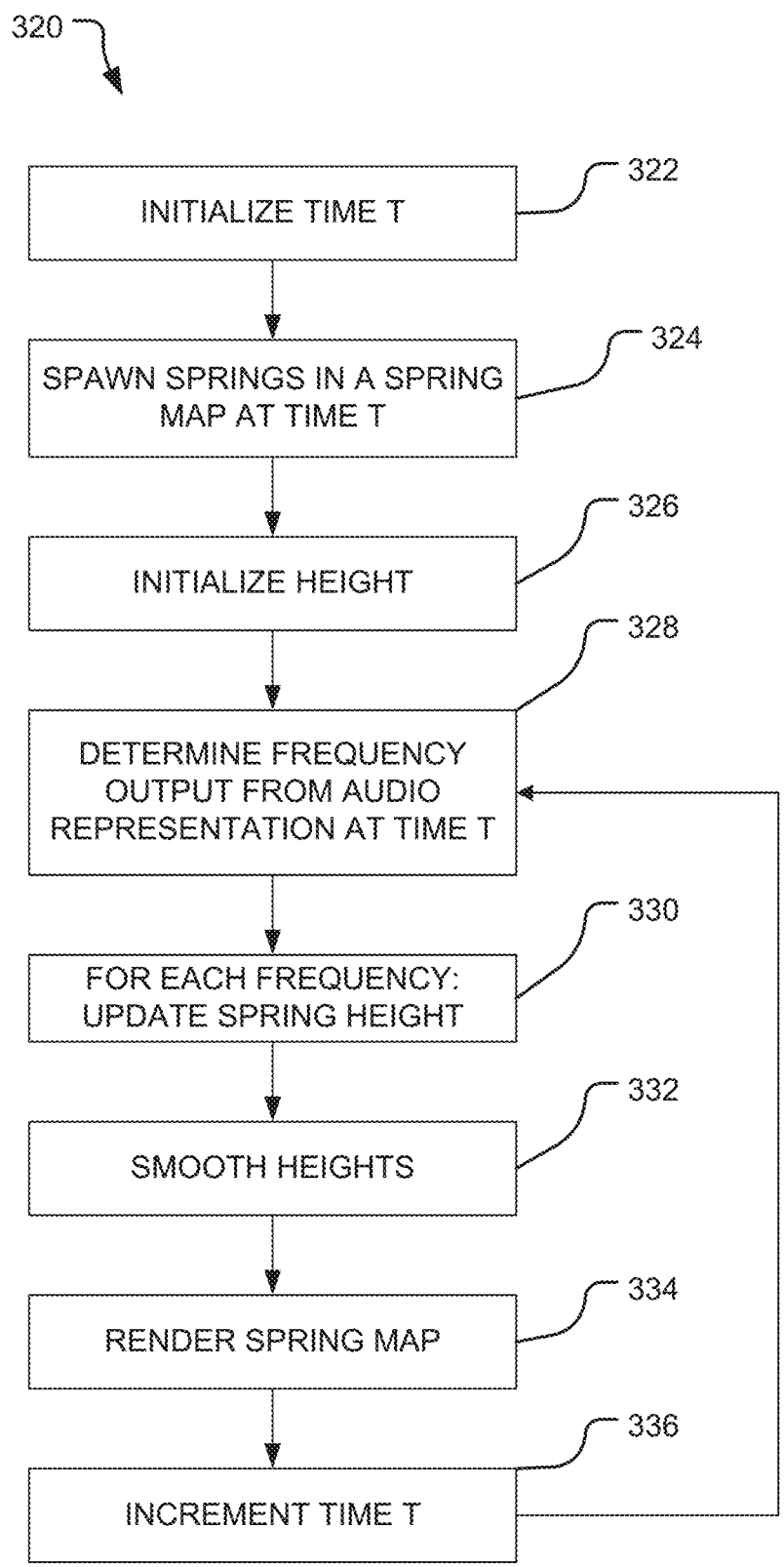

FIGS. 3A-3B are diagrams of an example process of displaying a widget to show a progress of audio conformance. In some examples, a method 300 may include determining a first audio representation of a first media being matched in a media matching process at operation 302; determining a second audio representation of a second media being matched in the media matching process at operation 304; constructing a first spring map of the first media based on the first audio representation at operation 306; constructing a second spring map of the first media based on the second audio representation at operation 308; and concurrently rendering the first spring map and the second spring map at operation 310. The examples of rendering the first and second spring maps concurrently are shown in FIGS. 2B-2D. As shown, the first and second spring maps provide the bouncing effect while the frequency output in the audio waveforms of each media vary with time. Further, as shown in FIG. 2C, the widget may include an additional video player window 210 to show the video of the media as the media is being matched.

With reference to FIG. 3B, a method 320 shows the operations in constructing the first spring map. Similar operations are also performed in constructing the second spring map. In some examples, the method 320 may include initializing at time T at operation 322 and spawning springs in a spring map at operation 324. At an initial time, the process 320 may spawn one or more springs in a spring map. The process 320 may also initialize the height for each of the one or more springs in the spring map at operation 326. For each time instance, the process 320 may repeat the following: determining frequency output from the first audio representation at operation 328; repeating for one or more frequency bins in the frequency axis, updating a height for each of the springs in the frequency bin based on the frequency output at operation 330; and rendering the spring map at operation 334. An example of frequency bin may include a range of discrete frequency values. For example, a frequency bin may include a frequency range of 100 Hz along the frequency axis (e.g., 204 in FIG. 2A). Alternatively, the frequency bin may have a range of 20 Hz, 50 Hz, 150 Hz, or any suitable value for displaying.

Additionally, and/or alternatively, the process 320 may also include smoothing the height for each of the springs in the frequency bin before rendering the first spring map for each time instance. This may give a "slow-down" effect of the movement of the springs in the spring map. Examples of smoothing operations are further described with reference to FIG. 3B in the present disclosure.

In a non-limiting example, the various methods in FIGS. 3A-3B are further explained in detail. In generating the frequency output from the audio, for example, the process may obtain the frequency output of the audio using Fast Fourier Transform to convert an audio signal from the time domain to the frequency domain. The process may further generate the FFT output for n bins at time step T. The process may further apply an initial force to each frequency bin. For example, the process may apply force n*m (where m is scaling factor) to springs in first row (current time). The process may further update spring height locations with new force applied. In some examples, springs in the spring map may be defined in the form of a spring device and their motions may be defined using Hooke's law F=−kx and rotated at some frequency, where k is a constant factor characteristic of the spring (e.g., stiffness), and x is a small displacement compared to the total possible deformation of the spring. Each spring is given a force equal to some factor of the frequency bin of frequency output of the audio.

The spring is reset to its equilibrium length when it spawns for the first time. Then for each frequency bin given from the FFT on the audio source a force relative to the frequency at that bin is applied to a new spring giving the spring the ability to bounce. Before the next time step a smoothing operation is performed to give each neighbor spring some displacement.

In some examples, the process may smooth the height of the springs by summing the deltas of each spring's neighbor's heights. In some examples, a neighbor may be in the same frequency bin or at a time immediate before and after the current spring. The smoothing process may also include a blur operation similar to how a blurring of an image is performed by summing neighboring data of each pixel and applying the sum to itself. This effectively brings lower neighbors up and higher neighbors down, and the end result is a "slowed down" and exaggerated real time audio visualization.

In some examples, in rendering a spring map, the rendering operation (e.g., 334 in FIG. 3B) may render the spring map in a video player. The system may export multiple frames, for example, 10 seconds of frames, at a given frame rate (e.g., a frame rate of 15 fps, 30 fps) and build the frames into a 4096×4096 image. The image may include grid, where each cell in the grid may include a square. For example, in each frame, the image of 4096×4096 may include 256×256 squares to represent the spring map having discrete times and frequencies. In implementation, a full spring map, e.g., 4096×4096 may be decoded using a browser's built-in tools and then sent to the video card using a graphics API, such as WebGL 2.0. The system may control the rendering to be at a specific frame rate based on the input video's frame rate. The system may play the audio of the media at the exact same time, where the audio is retrieved at the same time the images are being matched.

Figure 4A:
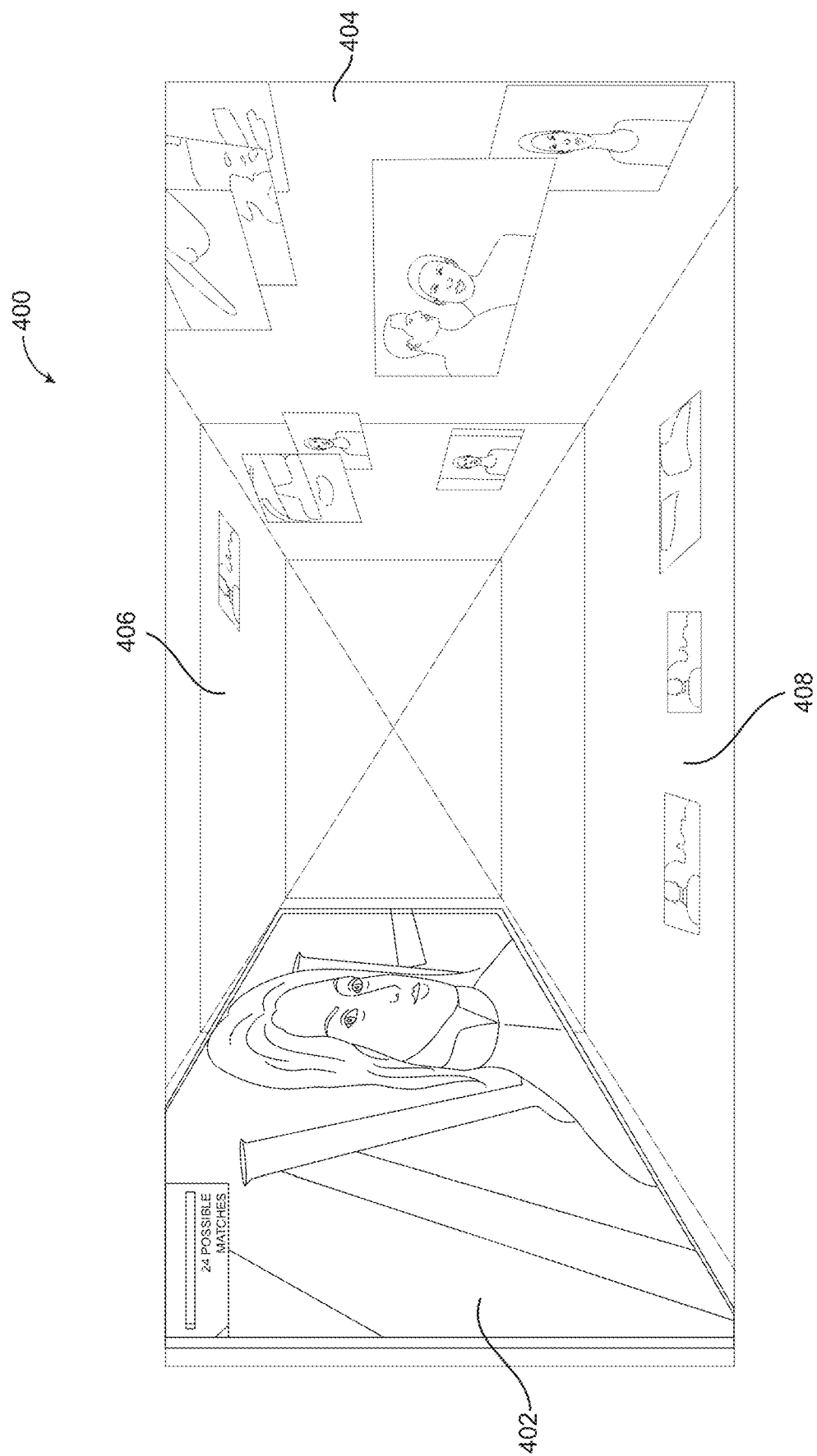
Figure 4B:
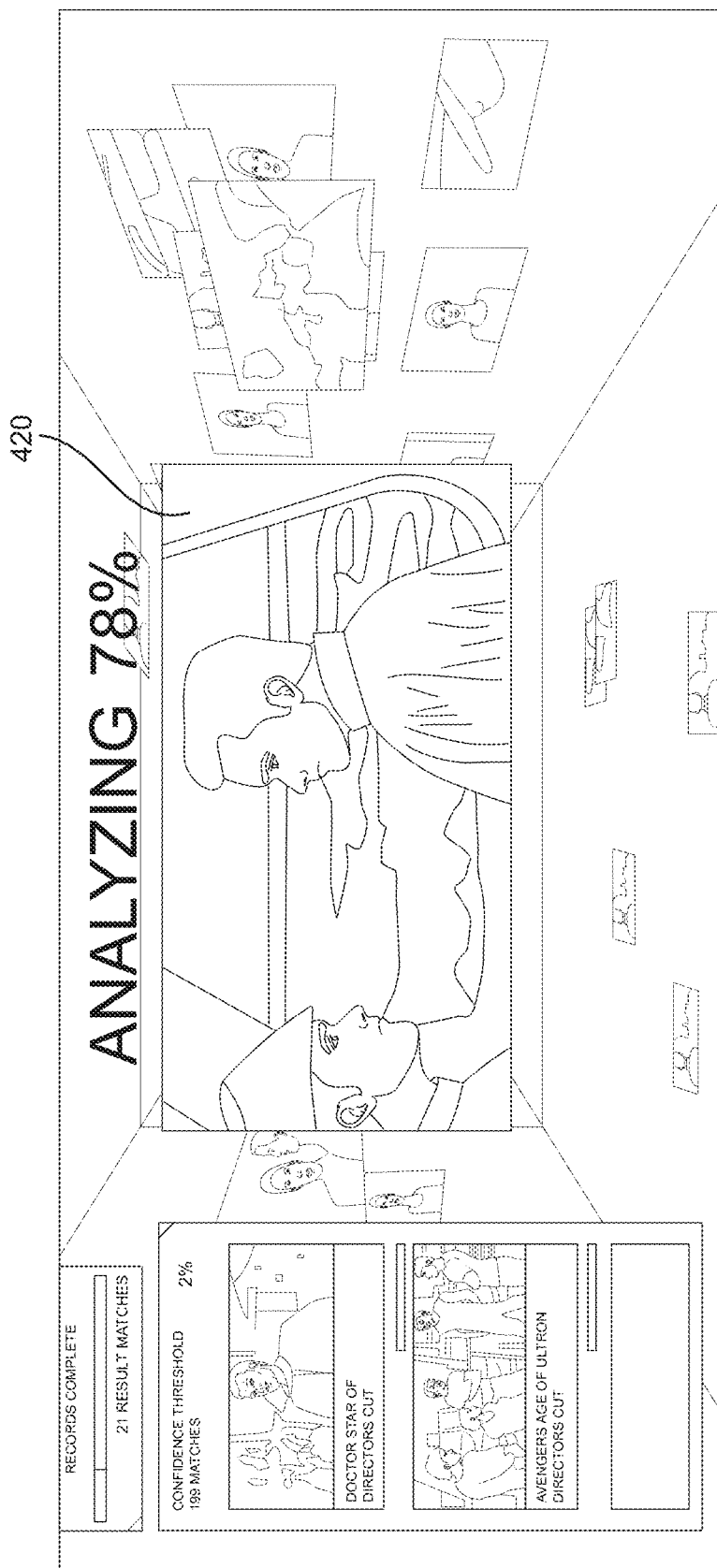

FIGS. 4A-4C are examples of a video search application. In this example, the media match engine may be configured to perform a matching between a first media file and one or more second media in a media library. A widget may be configured to display a progress of the matching. For example, as shown in FIG. 4A, the widget may include a virtual hallway presentation 400 that has at least a first side wall 402, for example, the left wall. The virtual hallway presentation 400 may further have a second side wall 404, e.g., a right wall, a ceiling 406, and a floor 408. Each of the side walls of the virtual hallway presentation 400, the ceiling 406 and the floor 408 may be rendered on a display via computer graphics engine that renders the 3D relationship of the walls to a 2D display. The virtual hallway presentation 400 may be configured to display a video scene from the second media while the second media is being compared to the first media to determine whether there is a match. As each second media file in the media library is being searched, the video of the known second media under comparison is displayed on a first sidewall 402 of the virtual hallway presentation 400, where the video changes as the second media file being searched changes. This provides visual information to a user about what second media is being searched.

In some examples, the virtual hallway presentation 400 may have a second sidewall 404, such as the right wall as noted. The second sidewall 404 may display a search space in the media library. As the media search is being performed, various media objects in the library may be presented on the second sidewall 404 and potentially navigated. Each media object may be represented by a visual representation, such as a key frame image or a playable video. As such, the second sidewall 404 may provide additional information to the user about the media library contents. In some embodiments, the additional images on the other walls, such as the ceiling 406 and/or the floor 408, may represent other media files in the library in a queue for comparison with the unknown first media file.

As shown in FIG. 4B, upon determining by the media match engine that the second media is a potential match to the first media, the widget may pause displaying the video of the second media on the first sidewall 402. In some examples, the widget may include a video player 420 configured to play the video of the second media for viewing by the user while the video on the first sidewall 402 is paused. Conversely, upon determining by the media match engine that the second media is not matched to the first media, the widget may continue displaying the video of the second media within the video player. In some examples, while the video of the second media is being played in the video player 420, the media match engine may analyze the contents of the second media to determine whether it is a true match. As shown in FIG. 4C, when a true match is found, the system may maintain the presentation of the matched second video in the video player to provide further access to the matched second video file to the user. For example, the system may display one or more previously matched media in a display panel 430 to allow a user to select or play a video.

Figure 5:
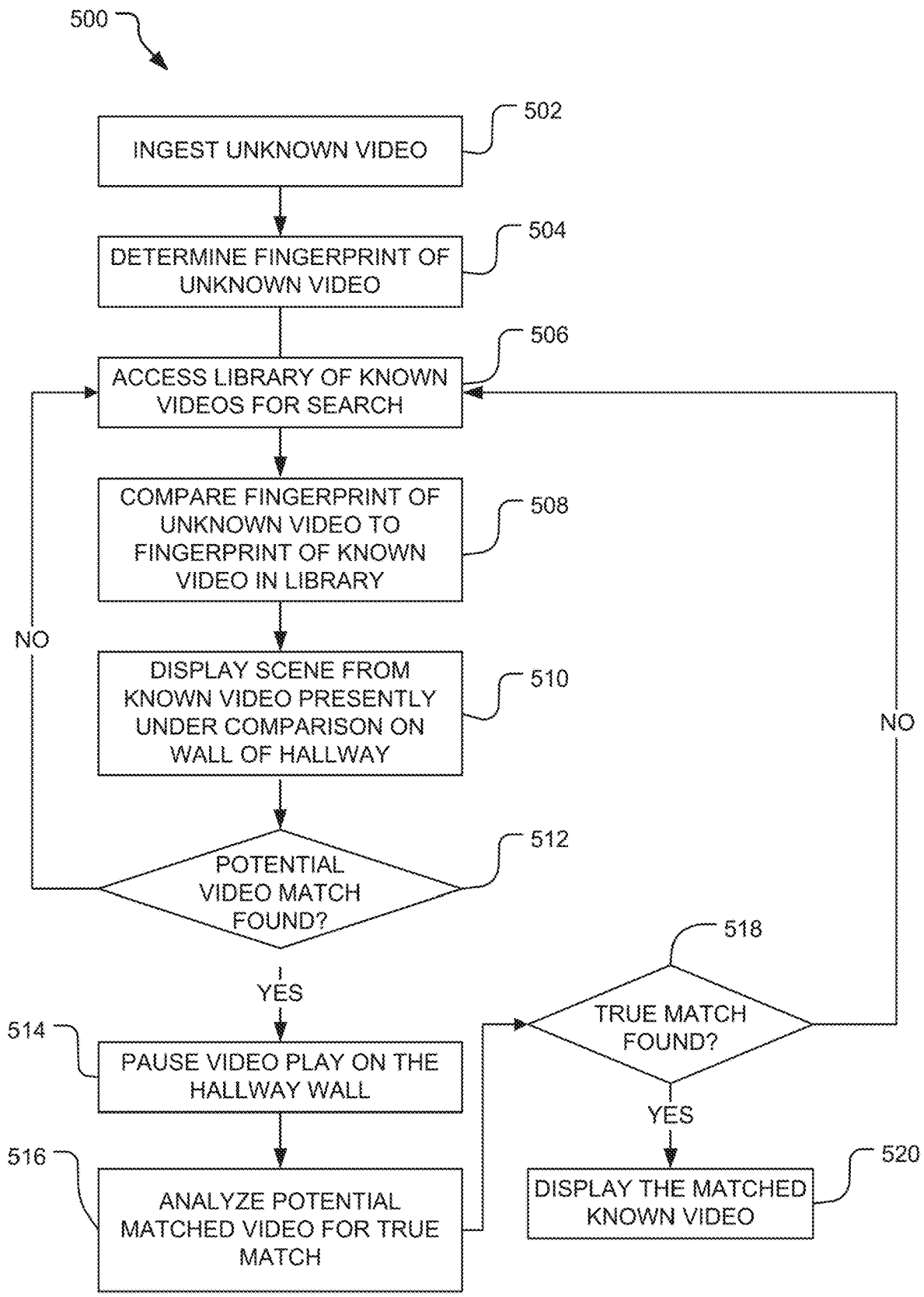
FIG. 5 is a diagram of an example process of displaying a widget to show a progress of a video search.

FIG. 5 is a diagram of an example process of displaying a widget to show a progress of a video search. In some examples, a process 500, which may be configured to implement various widgets shown in FIGS. 1 and 4A-4C, may include: ingesting an unknown video at operation 502; determining fingerprint of the unknown video at operation 504; accessing a library of known videos for search at operation 506; and comparing the fingerprint of the unknown video to fingerprints of known videos in the library at operation 508. The process 500 may further display the known video presently being compared to the unknown video on a wall of a virtual hallway presentation at operation 510. Upon determining that there is a match at operation 512, the process may pause the video play on the wall of the virtual hallway presentation at operation 514. The process may further analyze the matched video at operation 516 to determine whether there is a true match at operation 518. If a true match is not found, the process may continue the operations 506-518; otherwise, the process may display the matched video at operation 520 in a video player for further action by the user.

In some examples, the video search system as described in FIGS. 4A-4C and 5 may further include a widget that may be implemented in a similar manner as that described in FIGS. 1-3. For example, while the unknown video is compared with a candidate video in the media library, the widget may construct visual representations of the fingerprints of the unknown video and the candidate video in spring maps in a similar manner as described in FIGS. 2-3, and concurrently display them in a graphical interface. This facilitates user to visualize the contents of the media being matched while the matching is being performed.

In some examples, the system may render the various visualization items, such as the virtual hallway display, the spring maps, and/or a combination there of, in a similar manner as described in FIG. 3B. For example, the widget may include a video player. The system may export multiple frames, for example, 10 seconds of frames, at a given frame rate (e.g., a frame rate of 15 fps, 30 fps. etc.) and build the frames into a 4096×4096 image. The image may include grid, where each cell in the grid may include a square. For example, in each frame, the image of 4096×4096 may include 256×256 squares to represent the spring map having discrete times and frequencies. In implementation, a full image, e.g., 4096×4096 may be decoded using a browser's built-in tools and then sent to the video card using a graphics API, such as WebGL 2.0. The system may control the rendering to be at a specific frame rate based on the input video's frame rate. The system may play the audio of the media at the exact same time, where the audio is retrieved at the same time the images are being matched.

Figure 6:
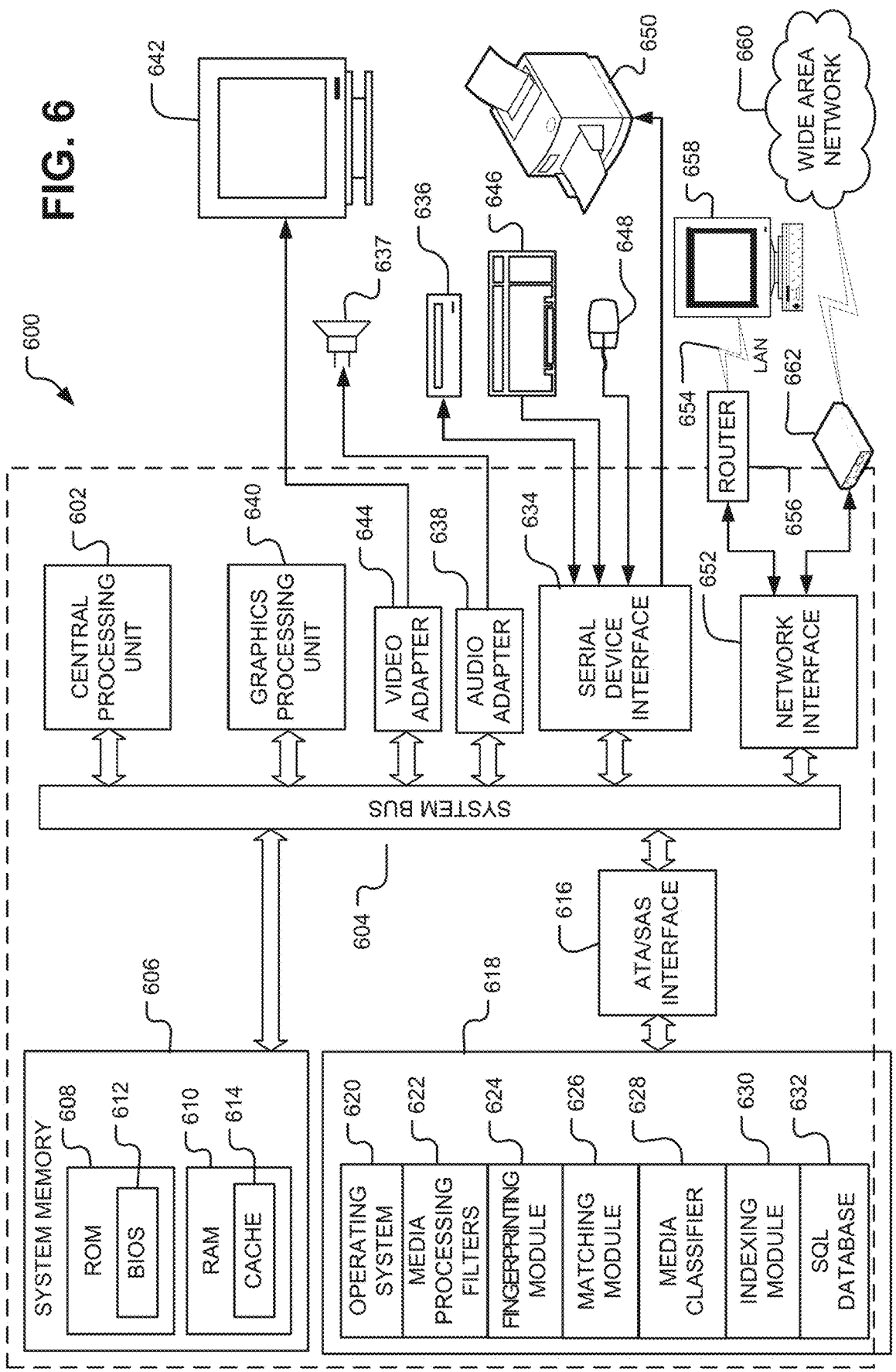
FIG. 6 is a schematic diagram of an example computer system for implementing various embodiments in the examples described herein.

FIG. 6 is a schematic diagram of an example computer-implemented system for implementing the various embodiments described in FIGS. 1-5. In some examples, a media system 600 may be embodied in a specifically configured, high-performance computing system including a cluster of computing devices in order to provide a desired level of computing power and processing speed. Alternatively, the process described herein could be implemented on a computer server, a mainframe computer, a distributed computer, a personal computer (PC), a workstation connected to a central computer or server, a notebook or portable computer, a tablet PC, a smart phone device, an Internet appliance, or other computer devices, or combinations thereof, with internal processing and memory components as well as interface components for connection with external input, output, storage, network, and other types of peripheral devices. Internal components of the system 600 in FIG. 6 are shown within the dashed line and external components are shown outside of the dashed line. Components that may be internal or external are shown straddling the dashed line.

In any embodiment or component of the system described herein, the system 600 includes one or more processors 602 and a system memory 606 connected by a system bus 604 that also operatively couples various system components. There may be one or more processors 602, e.g., a single central processing unit (CPU), or a plurality of processing units, commonly referred to as a parallel processing environment (for example, a dual-core, quad-core, or other multi-core processing device). In addition to the CPU, the image classifying system 600 may also include one or more graphics processing units (GPU) 640. A GPU 640 is specifically designed for rendering video and graphics for output on a monitor. A GPU 640 may also be helpful for handling video processing functions even without outputting an image to a monitor. By using separate processors for system and graphics processing, computers are able to handle video and graphic-intensive applications more efficiently. As noted, the system may link a number of processors together from different machines in a distributed fashion in order to provide the necessary processing power or data storage capacity and access.

The system bus 604 may be any of several types of bus structures including a memory bus or memory controller, a peripheral bus, a switched-fabric, point-to-point connection, and a local bus using any of a variety of bus architectures. The system memory 606 includes read only memory (ROM) 608 and random access memory (RAM) 610. A basic input/output system (BIOS) 612, containing the basic routines that help to transfer information between elements within the computer system 600, such as during start-up, is stored in ROM 608. A cache 614 may be set aside in RAM 610 to provide a high speed memory store for frequently accessed data.

A data storage device 618 for nonvolatile storage of applications, files, and data may be connected with the system bus 604 via a device attachment interface 616, e.g., a Small Computer System Interface (SCSI), a Serial Attached SCSI (SAS) interface, or a Serial AT Attachment (SATA) interface, to provide read and write access to the data storage device 618 initiated by other components or applications within the image classifying system 600. The data storage device 618 may be in the form of a hard disk drive or a solid state memory drive or any other memory system. A number of program modules and other data may be stored on the data storage device 618, including an operating system 620, one or more application programs, and data files. In an exemplary implementation, the data storage device 618 may store various media processing filters 622, a fingerprinting module 624, a matching module 626, a media classifier 628, an indexing module 630, as well as the media files being processed and any other programs, functions, filters, and algorithms necessary to implement the procedures described herein. The data storage device 618 may also host a database 632 (e.g., a SQL database) for storage of video frame time stamps, audio track framing parameters, audio track fingerprints, hashing algorithms, media meta data, and other relational data necessary to perform the media processing and classification procedures described herein. Note that the data storage device 618 may be either an internal component or an external component of the computer system 600 as indicated by the hard disk drive 618 straddling the dashed line in FIG. 6.

In some configurations, the image classifying system 600 may include both an internal data storage device 618 and one or more external data storage devices 636, for example, a CD-ROM/DVD drive, a hard disk drive, a solid state memory drive, a magnetic disk drive, a tape storage system, and/or other storage system or devices. The external storage devices 636 may be connected with the system bus 604 via a serial device interface 634, for example, a universal serial bus (USB) interface, a SCSI interface, a SAS interface, a SATA interface, or other wired or wireless connection (e.g., Ethernet, Bluetooth, 802.11, etc.) to provide read and write access to the external storage devices 636 initiated by other components or applications within the image classifying system 600. The external storage device 636 may accept associated computer-readable media to provide input, output, and nonvolatile storage of computer-readable instructions, data structures, program modules, and other data for the system 600.

A display device 642, e.g., a monitor, a television, or a projector, or other type of presentation device may also be connected to the system bus 604 via an interface, such as a video adapter 640 or video card. Similarly, audio devices, for example, external speakers, headphones, or a microphone (not shown), may be connected to the system bus 604 through an audio card or other audio interface 638 for presenting audio associated with the media files.

In addition to the display device 642 and audio device 647, the system 600 may include other peripheral input and output devices, which are often connected to the processor 602 and memory 606 through the serial device interface 644 that is coupled to the system bus 604. Input and output devices may also or alternately be connected with the system bus 604 by other interfaces, for example, a universal serial bus (USB), an IEEE 1494 interface ("Firewire"), a parallel port, or a game port. A user may enter commands and information into the system 600 through various input devices including, for example, a keyboard 646 and pointing device 648, for example, a computer mouse. Other input devices (not shown) may include, for example, a joystick, a game pad, a tablet, a touch screen device, a satellite dish, a scanner, a facsimile machine, a microphone, a digital camera, and a digital video camera.

Output devices may include a printer 650. Other output devices (not shown) may include, for example, a plotter, a photocopier, a photo printer, a facsimile machine, and a printing press. In some implementations, several of these input and output devices may be combined into single devices, for example, a printer/scanner/fax/photocopier. It should also be appreciated that other types of computer-readable media and associated drives for storing data, for example, magnetic cassettes or flash memory drives, may be accessed by the computer system 600 via the serial port interface 644 (e.g., USB) or similar port interface. In some implementations, an audio device such as a loudspeaker may be connected via the serial device interface 634 rather than through a separate audio interface.

The system 600 may operate in a networked environment using logical connections through a network interface 652 coupled with the system bus 604 to communicate with one or more remote devices. The logical connections depicted in FIG. 6 include a local-area network (LAN) 654 and a wide-area network (WAN) 660. Such networking environments are commonplace in home networks, office networks, enterprise-wide computer networks, and intranets. These logical connections may be achieved by a communication device coupled to or integral with the system 600. As depicted in FIG. 6, the LAN 654 may use a router 656 or hub, either wired or wireless, internal or external, to connect with remote devices, e.g., a remote computer 658, similarly connected on the LAN 654. The remote computer 658 may be another personal computer, a server, a client, a peer device, or other common network node, and typically includes many or all of the elements described above relative to the computer system 600.

To connect with a WAN 660, the system 600 typically includes a modem 662 for establishing communications over the WAN 660. Typically the WAN 660 may be the Internet. However, in some instances the WAN 660 may be a large private network spread among multiple locations, or a virtual private network (VPN). The modem 662 may be a telephone modem, a high speed modem (e.g., a digital subscriber line (DSL) modem), a cable modem, or similar type of communications device. The modem 662, which may be internal or external, is connected to the system bus 604 via the network interface 652. In alternate embodiments the modem 662 may be connected via the serial port interface 644. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system comprising
   a media match engine comprising a processor configured to perform a matching between an unknown first media and a plurality of known second media to identify the unknown first media if matched to one of the known second media; and
   a widget configured to display a progress of the matching, wherein the widget further comprises
      a first display area configured to display a first visual representation of the unknown first media; and
      a second display area separate from the first display area configured to concurrently display a second visual representation of one of the plurality of known second media being compared to the unknown first media while the matching is being performed.

2. The system of claim 1, wherein the first and second visual representations each comprises a spring map representing a plurality of audio frequencies of the unknown first media and one of the known second media concurrently being matched to the unknown first media, respectively.

3. The system of claim 2, wherein each spring map comprises a first axis indicating a time, a second axis indicating a frequency, and a height of a corresponding point of the respective first and second visual representations at each coordinate defined by the first axis and the second axis.

4. The system of claim 3, wherein
   the height at each coordinate in the first visual representation is based on a frequency output of an audio waveform associated with the unknown first media; and the height at each coordinate in the second visual representation is based on a frequency output of an audio waveform associated with the known second media.

5. The system of claim 4, wherein the processor is further configured to update the height at each coordinate in the first visual representation and to adjust the height at each coordinate in the second visual representation by a smoothing operation.

6. The system of claim 5, wherein the smoothing operation on the height at a given coordinate is based on a sum of differences of heights for one or more neighboring coordinates of the given coordinate.

7. The system of claim 4, wherein the height at each coordinate in the first and second visual representations is defined by an application of Hooke's law.

8. The system of claim 4, wherein
the height at each coordinate in the first visual representation corresponds to a discrete frequency range bin of the audio waveform associated with the unknown first media; and
the height at each coordinate in the second visual representation corresponds to a discrete frequency range bin of the audio waveform associated with the known second media.

9. A method comprising
determining a first audio representation of an unknown first media being matched in a media matching process to identify the unknown first media;
determining a second audio representation of a known second media selected from a plurality of known media being compared to the unknown first media to identify a match from among the plurality of known media in the media matching process;
constructing a first spring map of the unknown first media based on the first audio representation;
constructing a second spring map of the known second media based on the second audio representation; and
concurrently rendering the first spring map in a first display area and the second spring map in a second display area separate from the first display area during the media matching process.

10. The method of claim 9, wherein constructing the first spring map comprises
at an initial time, spawning one or more springs in the first spring map comprising a time axis and a frequency axis;
initializing a height for each of the one or more springs in the first spring map;
repeating for each time instance on the time axis, determining a frequency output from the unknown first audio representation;
repeating for one or more frequency bins on the frequency axis, updating a height for each of the springs in each frequency bin based on the frequency output; and
rendering the first spring map.

11. The method of claim 10 further comprising smoothing the height for each of the springs in the frequency bin before rendering the first spring map for each time instance.

12. The method of claim 11, wherein smoothing the height for each of the springs in the frequency bin comprises updating the height based on a sum of differences of heights of springs for one or more neighboring frequency bins.

13. The method of claim 9, wherein constructing the second spring map comprises
at an initial time, spawning one or more springs in the second spring map comprising a time axis and a frequency axis;
initializing a height for each of the one or more springs in the second spring map;
repeating for each time instance on the time axis, determining a frequency output from the known second audio representation;
repeating for one or more frequency bins on the frequency axis, updating a height for each of the springs in each frequency bin based on the frequency output; and
rendering the second spring map.

14. The method of claim 13 further comprising smoothing the height for each of the springs in the frequency bin before rendering the second spring map for each time instance.

15. The method of claim 14, wherein smoothing the height for each of the springs in the frequency bin comprises updating the height based on a sum of differences of heights of springs for one or more neighboring frequency bins.

* * * * *